United States Patent
Van Wyk

(10) Patent No.: US 10,654,704 B2
(45) Date of Patent: May 19, 2020

(54) FLUID DELIVERY DEVICE

(71) Applicant: LDJ Manufacturing, Inc., Pella, IA (US)

(72) Inventor: Loren Van Wyk, Pella, IA (US)

(73) Assignee: LDJ MANUFACTURING, INC., Pella, IA (US)

( * ) Notice: Subject to any disclaimer, the term of this patent is extended or adjusted under 35 U.S.C. 154(b) by 0 days.

(21) Appl. No.: 14/657,697

(22) Filed: Mar. 13, 2015

(65) Prior Publication Data

US 2015/0183629 A1 Jul. 2, 2015

Related U.S. Application Data

(63) Continuation-in-part of application No. 13/402,341, filed on Feb. 22, 2012, now abandoned.

(51) Int. Cl.
*B67D 7/02* (2010.01)
*F16K 11/08* (2006.01)

(52) U.S. Cl.
CPC ............ *B67D 7/0294* (2013.01); *F16K 11/08* (2013.01); *Y10T 137/85986* (2015.04); *Y10T 137/85994* (2015.04); *Y10T 137/86035* (2015.04); *Y10T 137/87708* (2015.04)

(58) Field of Classification Search
CPC ...... B64F 1/28; F16H 57/0436; F04C 29/124; F16K 11/08
USPC ............................................. 137/899, 899.3
See application file for complete search history.

(56) References Cited

U.S. PATENT DOCUMENTS

| | | | | |
|---|---|---|---|---|
| 3,136,127 A * | 6/1964 | Weaver | .................. | B23Q 35/18 251/3 |
| 3,169,667 A * | 2/1965 | Headrick | .................. | B64F 1/28 137/172 |
| 3,282,380 A * | 11/1966 | Burrell | .................... | F01M 5/025 184/1.5 |
| 3,971,400 A * | 7/1976 | Thompson | .............. | B60P 3/224 137/205 |
| 5,052,443 A * | 10/1991 | Evangelist, Jr. | .......... | B60S 5/00 137/565.17 |
| 5,165,371 A * | 11/1992 | Wada | ....................... | F02M 1/16 123/179.15 |
| 7,293,587 B1 * | 11/2007 | Broberg | ................. | A63H 17/00 141/231 |

(Continued)

OTHER PUBLICATIONS

Micro Matic, "RSV—Reusable Stainless Valves: Comprehensive Instructions", 2010, pp. 1 and 4.*

*Primary Examiner* — Angelisa L. Hicks
(74) *Attorney, Agent, or Firm* — Camille L. Urban; BrownWinick Law Firm

(57) ABSTRACT

Provided is a mobile fluid pumping system which may include a reservoir and, a pump actuated by a reversible motor. In the first configuration, the reversible motor is operated in a first direction causing a fluid to flow in a first direction and operated in a second direction causing fluid to flow in a second direction thereby providing means to fill a reservoir and then transfer fluid from the reservoir to a vessel or tank. The fluid delivery device provides means to substantially evacuate fluid from any connectors in the system thereby avoiding problems otherwise associated with remaining fluid that may freeze. Further, the device is designed to provide a closed load and unload system meeting ISO 022241.

16 Claims, 13 Drawing Sheets

(56) References Cited

U.S. PATENT DOCUMENTS

| | | | |
|---|---|---|---|
| 2003/0206805 A1* | 11/2003 | Bishop | F04B 1/0426 417/44.2 |
| 2006/0081304 A1* | 4/2006 | Franks | B67D 7/0205 141/65 |
| 2010/0319326 A1* | 12/2010 | Haeberer | F01N 3/2066 60/286 |
| 2011/0000332 A1* | 1/2011 | Gianone | F16H 57/0436 74/607 |
| 2011/0048572 A1* | 3/2011 | Batson | B64F 1/28 141/1 |

* cited by examiner (A)

(C)

FLUID DELIVERY DEVICE

CROSS-REFERENCE TO RELATED APPLICATION

This application is a continuation-in-part application of Ser. No. 13/402,341 filed in the U.S. Patent and Trademark Office on Feb. 22, 2012, the entire contents which are incorporated herein.

BACKGROUND

1. Field

Example embodiments relate to a pumping system, a fluid delivery system that includes the pumping system, and a method for delivering fluid.

2. Description of the Related Art

NOx is a generic term for the mono-nitrogen oxides NO and $NO_2$ (nitric oxide and nitrogen dioxide). NOx is produced from the reaction of nitrogen and oxygen gases in the air during combustion, especially at high temperatures. For example, NOx may be produced by a combustion engine. NOx is considered a pollutant. Thus, steps have been taken to reduce the production of NOx generated by motor vehicles.

Conventional diesel engines generate, amongst other products, NOx, Oxygen ($O_2$), and Carbon (C). Vehicles employing diesel engines often include a system to eliminate or reduce the amount of NOx produced. For example, some systems use catalytic conversion reduction (commonly referred to as SCR) to reduce NOx emissions.

A conventional system 5 employing SCR is illustrated in FIG. 1. The system 5 includes a particulate filter 10, a decomposition reactor 20 having a diesel exhaust fluid (DEF) dosing valve, an SCR catalyst 30, and a DEF storage tank 40 providing DEF to the DEF dosing valve. The particulate filter 10 includes a diesel oxidation catalyst 12 and a wall-flow filter 14. In the conventional system 5, exhaust from the diesel engine enters the particulate filter 10, over the diesel oxidation catalyst 12, and into the wall-flow filter 14 where C is contained. $O_2$ and NO pass through the diesel oxidation catalyst 12 where the $O_2$ and NO are converted into Nitrogen dioxide ($NO_2$). The $NO_2$ flows through the wall-flow filter 14 where is reacts with the C to produce $CO_2$ and NOx. As the exhaust passes out of the particulate filter 10, DEF (in the form of a mist) is sprayed onto a hot exhaust screen of the decomposition reactor 20. The DEF and the $CO_2$ form ammonia ($NH_3$) through a series of reactions. The NOx and $NH_3$ then pass to the SCR catalyst 30 where they react to form $N_2$ and $H_2O$ thus reducing or eliminating NOx emissions.

As outlined above DEF is important for reducing the emission of NOx produced through a combustion process. Several conventional vehicles, for example, cars, trucks, and tractors, store DEF in a tank attached thereto. Typically, the DEF tank is filled/refilled when the vehicle is serviced (for example, when the vehicle's oil is changed). Such an operation is generally employed in a garage setting. Although there have been examples of people using oil or antifreeze jugs to transport DEF from a DEF shuttle or barrel to an engine DEF tank, the result has often been a contamination of the DEF which renders it useless in the process for decreasing NOx. As of yet, there is no practical system for delivering DEF to vehicles outside of the garage setting or examples of a system for delivering DEF that is compliant with ISO 22241 (a relatively recently released standard required by engine manufacturers and EPA regulators).

SUMMARY

Example embodiments relate to a pumping system, a fluid delivery system that includes the pumping system, and a method for delivering fluid. The pumping system and the fluid delivery system may be used to pump and deliver diesel exhaust fluid (DEF).

In accordance with example embodiments, a pumping system may include a tank, a pump, and a valve. The valve may be configured to have a first configuration and a second configuration. In the first configuration, the valve may allow fluid to flow from the pump, through the valve, and to the tank. In the second configuration, the valve may allow fluid to flow from the pump, through the valve, and to an outside structure.

In accordance with example embodiments, a fluid delivery device may include a tank and a pumping system configured to provide fluid to the tank and extract the fluid from the tank.

In accordance with example embodiments, a pumping system may include a tank or reservoir, a pump having a motor, wherein the direction of fluid flowing through the pump is determined by the direction of the motor. Employing a reversible motor provides means to move fluid into or out of the reservoir. Further, this arrangement provides means to generally completely empty the pump and any conduits or connecting members used to transport the fluid and avoid problems that would be caused by freezing of the remaining fluid. It also provides a closed system greatly reducing chances of contamination.

BRIEF DESCRIPTION OF THE DRAWINGS

Example embodiments are described in detail below with reference to the attached drawing figures, wherein.

DETAILED DESCRIPTION

Figure 1:
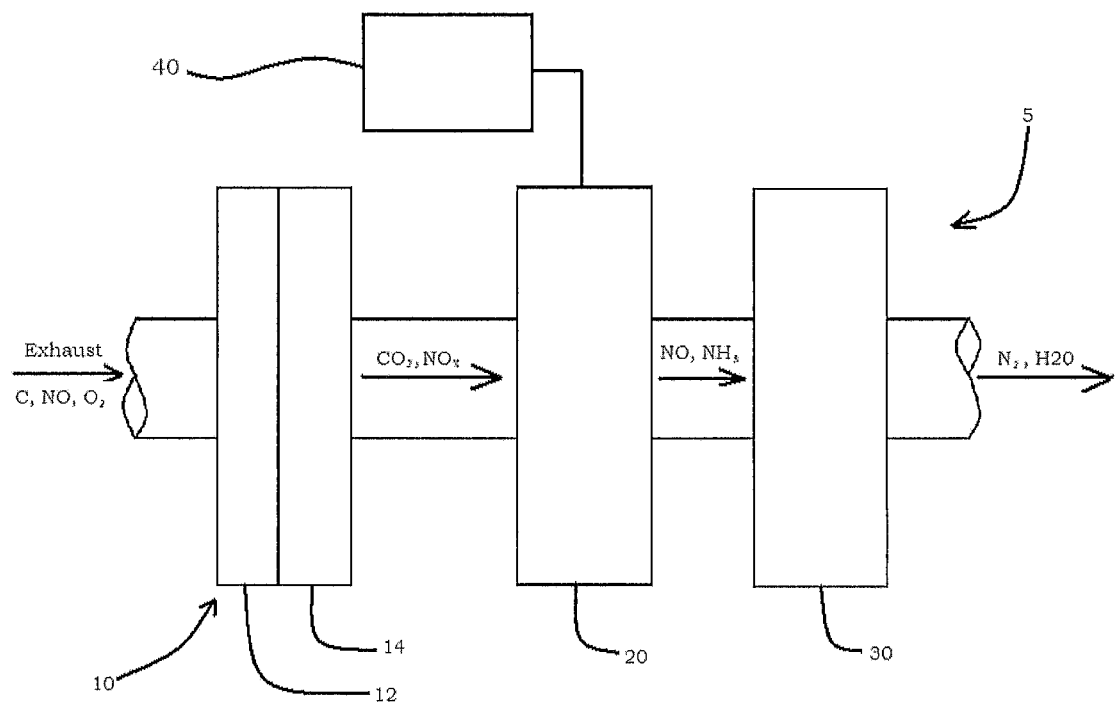
FIG. 1 is a view of a conventional NOx reducing system.

Example embodiments will now be described more fully with reference to the accompanying drawings, in which example embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the sizes of components may be exaggerated for clarity.

It will be understood that when an element or layer is referred to as being "on," "connected to," or "coupled to" another element or layer, it can be directly on, connected to, or coupled to the other element or layer or intervening elements or layers that may be present. In contrast, when an element is referred to as being "directly on," "directly connected to," or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers, and/or sections, these elements, components, regions, layers, and/or sections should not be limited by these terms. These terms are only used to distinguish one element, component, region, layer, and/or section from another elements, component, region, layer, and/or section. Thus, a first element component region, layer or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the structure in use or operation in addition to the orientation depicted in the figures. For example, if the structure in the figures is turned over, elements described as "below" or "beneath" other elements or features would then be oriented "above" the other elements or features. Thus, the exemplary term "below" can encompass both an orientation of above and below. The structure may be otherwise oriented (rotated 90 degrees or at other orientations) and the spatially relative descriptors used herein interpreted accordingly.

Embodiments described herein will refer to plan views and/or cross-sectional views by way of ideal schematic views. Accordingly, the views may be modified depending on manufacturing technologies and/or tolerances. Therefore, example embodiments are not limited to those shown in the views, but include modifications in configurations formed on the basis of manufacturing process. Therefore, regions exemplified in the figures have schematic properties and shapes of regions shown in the figures exemplify specific shapes or regions of elements, and do not limit example embodiments.

The subject matter of example embodiments, as disclosed herein, is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other technologies. Generally, example embodiments relate to a pumping system, a fluid delivery system that includes the pumping system, and a method for delivering fluid. In example embodiments the pumping system may pump DEF, the fluid delivery system may deliver DEF, and the method may be a method for delivering DEF. Example embodiments, however, are not limited thereto as the pumping system may pump fluids other than DEF, for example, diesel fuel, gasoline, water, cleaning fluids, etc.

Figure 2:
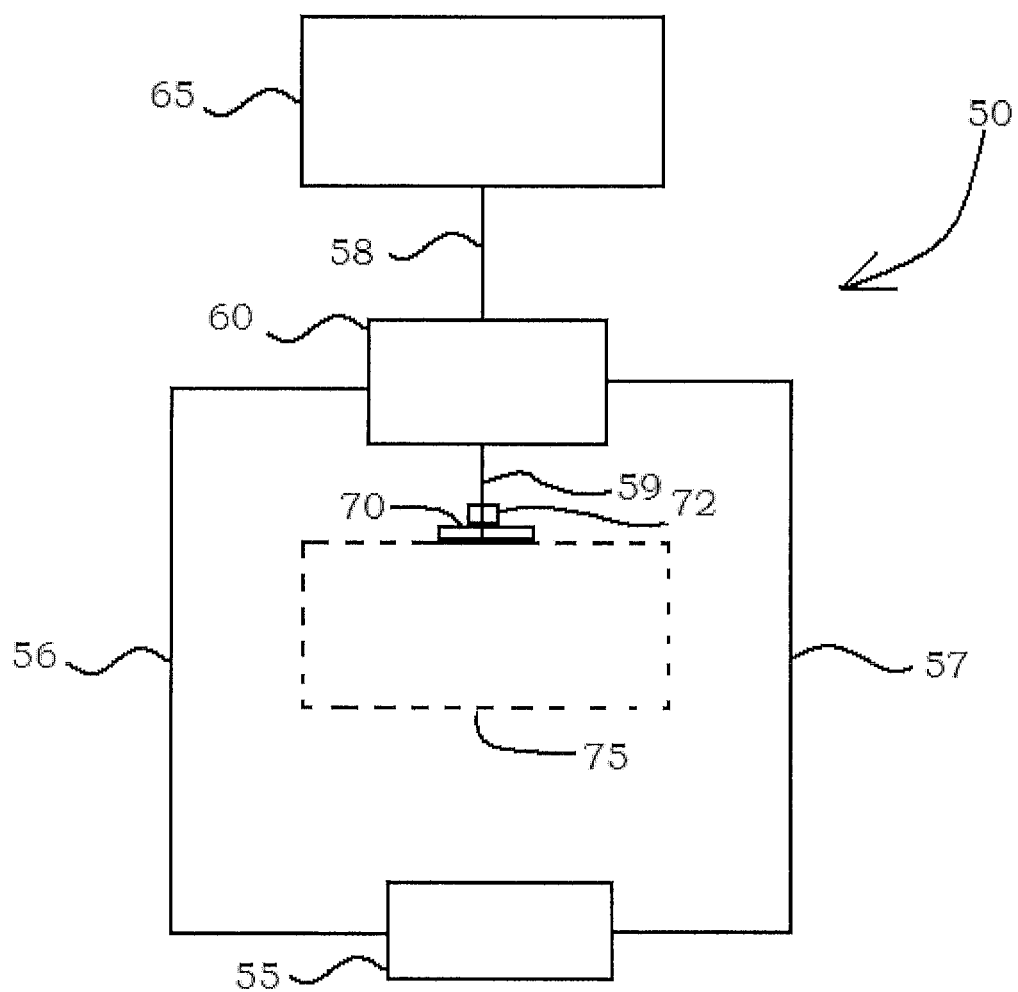
FIG. 2 is a schematic view of a pumping system in accordance with example embodiments.

FIG. 2 illustrates a pumping system 50 in accordance with example embodiments. As shown in FIG. 2, the pumping system 50 includes a pump 55, a valve 60, and a tank 65 that may be a deionized tank, for example a dionized tank purified to ISO 22241 standard. In example embodiments, the pump 55 may be connected to the valve 60 via a first connecting member 56 and a second connecting member 57. In example embodiments, the first connecting member 56 may be configured to transport fluid, for example, DEF, from the pump 55 to the valve 60. For example, the first connecting member 56 may be a hose, a pipe, or a tube. In example embodiments the second connecting member 57 may be configured to transport fluid, for example, DEF, from the valve 60 to the pump 55. For example, the second connecting member 57 may be a hose, a pipe, or a tube. In example embodiments, the tank 65 may be connected to the valve 60 by a third connecting member 58. The third connecting member 58 may be configured to transfer fluid, for example, DEF, between the tank 65 and the valve 60. For example, the third connecting member 58 may be a hose, a pipe, or a tube. In example embodiments, a fourth connecting member 59 may connect the valve 60 to an external structure 75. In example embodiments, the external structure 75 may be a tank, though example embodiments are not limited thereto. The fourth connecting member 59 may be configured to transport fluid, for example, DEF to and from the valve 60. For example, the fourth connecting member 59 may be configured to transport fluid from the valve 60 to the external structure 75 or to transfer fluid from the external structure 75 to the valve 60. In example embodiments, a connecting structure 70 may be attached to an end of the fourth connecting member 59 to facilitate a connection between the fourth connecting member 59 and the external structure 75. For example, the connecting structure 70 may be a coupler or a nozzle. For example, the coupler could be an RSV coupler and the nozzle could be an auto trip nozzle.

In example embodiments, an end of the fourth connecting member 59 may include a fitting 72 that is configured to attach the connecting structure 70 to the fourth connecting member 59. For example, the fitting 72 may be able to connect to more than one type of connecting structure 70 thus allowing for interchangeable connecting structures to attach to the end of the fourth connecting member 59. For example, the fitting 72 may allow for a user to attach an auto trip nozzle to the end of the fourth connecting member 59 in the event pumping system 50 is used to dispense a fluid, for example, DEF, or alternatively allow the user to attach a coupler to the end of the fourth connecting member 59 in the event the pumping system 50 is used to collect a fluid from the external structure 75.

Although example embodiments of the pumping system 50 may include the first, second, and third connecting members 56, 57, and 58 to interconnect the pump 55, the valve 60, and the tank 65, example embodiments are not limited thereto. For example, rather than providing the third connecting member 58 to connect the valve 60 to the tank 65, the tank 65 may be directly connected to a nozzle on the valve 60. Thus, it would not be necessary to connect the valve 60 to the tank 65 via the third connecting member 58. Likewise, the pump 55 may be directly connected to a nozzle of the valve 60, thus, at least one of (or both of) the first and second connecting members 56 and 57 may not be necessary to implement the above pumping system 50.

In example embodiments, the pump 55 may be an electric pump which may be powered by a battery, for example, a deep-cycle marine battery. However, example embodiments are not limited thereto. For example, the pump 55 may be an electric pump which is powered by a battery of an automobile, for example, a truck, tractor, or car. As another example, the pump 55 may be an electric pump which is powered by an AC source. For example, the pump 55 may be connected to wall socket of a conventional building. In addition, the pump 55 is not limited to an electric pump. For example, the pump 55 may be powered by a gasoline engine, a diesel engine, or by hand.

In some embodiments, the pump 55 may comprise a first side 55a and a second side 55b and may be powered by a reversible motor 200. The direction of the motor 200 determines the direction of flow of fluid being pumped. See FIG. 10.

Figure 3:
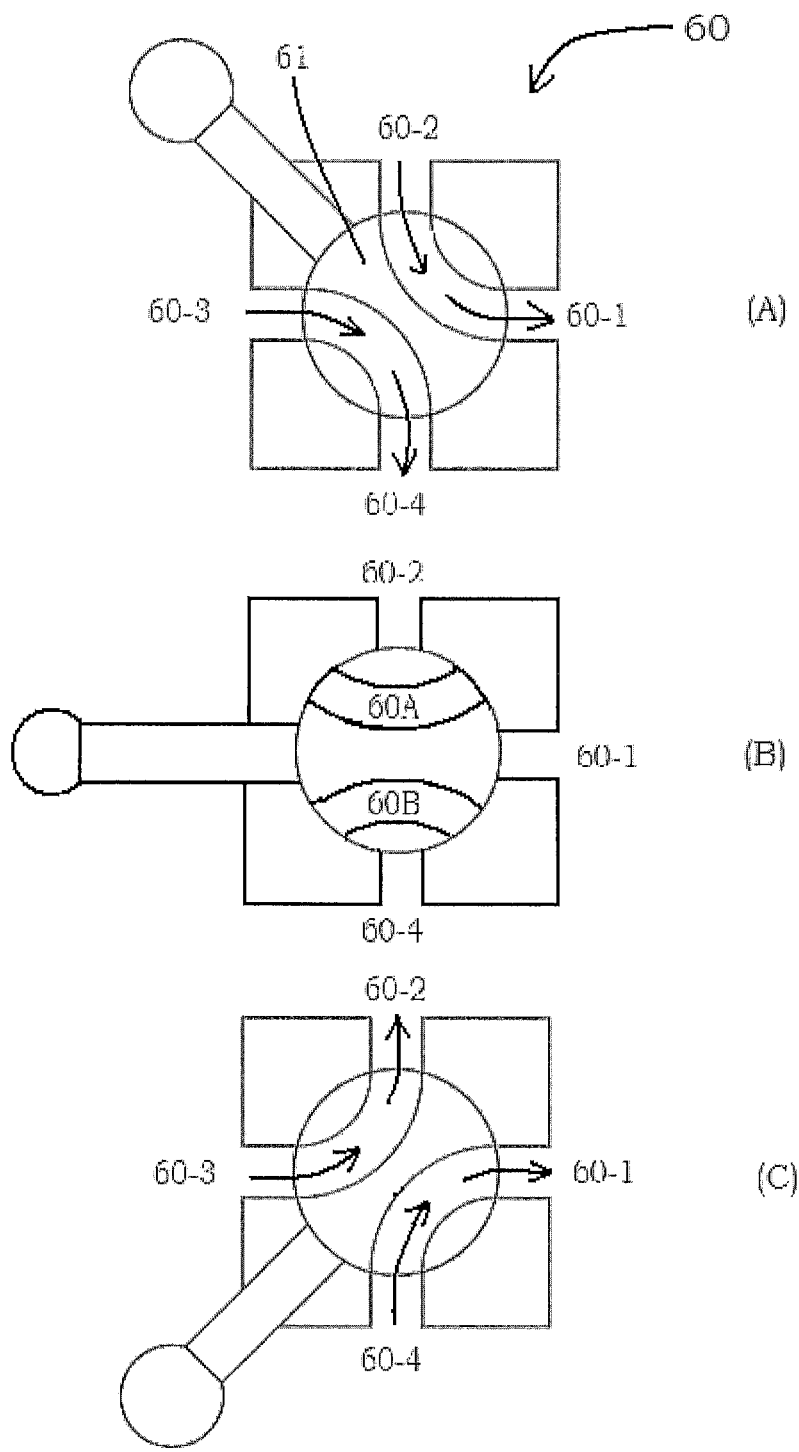
FIG. 3 is a schematic view of a four-way valve in accordance with example embodiments.

In example embodiments, the valve 60 may be a four-way valve. Although four-way valves are relatively common, a brief description thereof will be provided for the sake of completeness. Referring to FIG. 3, a four-way valve (sometimes called a four-way cock) may be a fluid control valve having a body and a plug 61. In example embodiments, the body may have a first port 60-1, a second portion port 60-2, a third port 60-3, and a fourth port 60-4 that may be equally spaced around a valve chamber. The plug 61 may have two passages 60A and 60B to connect adjacent ports. In example embodiments, the plug 61 may be cylindrical or tapered, or a ball, though example embodiments are not limited to only a cylindrical or tapered or ball configuration.

In FIG. 3, the valve 60 is shown as having three configurations: (A), (B), and (C). In configurations (A) and (C) fluid may flow through the valve 60 whereas, in configuration (B), flow is prevented from flowing through the valve 60 since the passages 60A and 60B are not aligned with any of the first through fourth ports 60-1, 60-2, 60-3, and 60-4. In example embodiments, fluid may enter the valve 60 through the third port 60-3 and leave the valve 60 through the first port 60-1 when the valve is in either configuration (A) or (C). In configuration (A), fluid enters the third port 60-3, passes through the second passage 60B, and exits the valve 60 through the fourth port 60-4 whereas in the third position (C) fluid entering the third port 60-3 passes through the first passage 60A exits the valve 60 through the second port 60-2. In configuration (A), fluid leaving the first port 60-1 entered the valve 60 through the second port 60-2 whereas fluid leaving the first port 60-1 in the third configuration (C) entered the valve 60 through the fourth port 60-4.

Figure 4A:
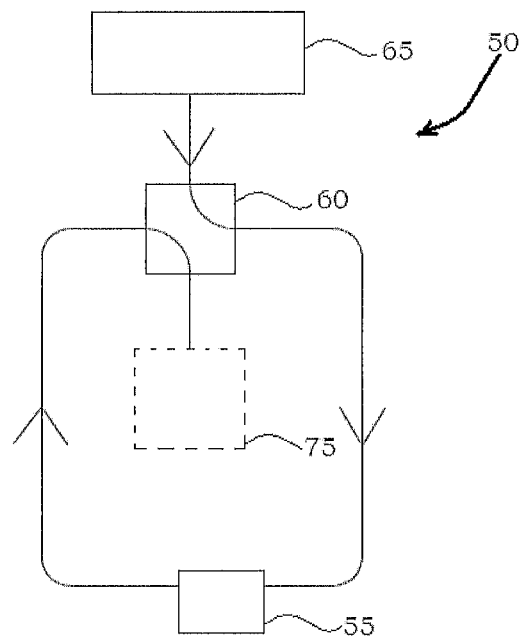
FIG. 4A is a flow diagram of the pumping system in accordance with example embodiments.
Figure 4B:
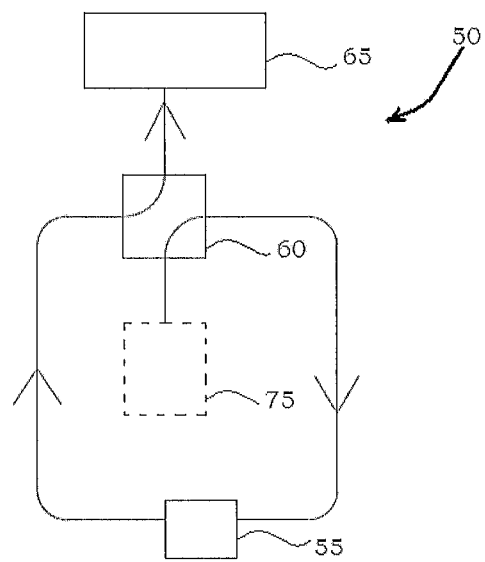
FIG. 4B is a flow diagram of the pumping system in accordance with example embodiments.

FIGS. 4A and 4B represents fluid flow diagrams of the pumping system 50, wherein the valve 60 is a four-way valve similar to that illustrated in FIG. 3. More specifically, FIG. 4A illustrates fluid flowing through the system 50 when the valve 60 is in configuration (A) and FIG. 4B illustrates fluid flowing through the system 50 when the valve 60 is in configuration (C).

As shown in FIG. 4A, when the valve 60 is in configuration (A) fluid may be drawn from the tank 65 to the valve 60 where it is drawn to the pump 55 and pumped back to the valve 60 where the fluid is then directed to the structure 75. As noted above, the structure 75 may be a tank, for example, a tank of a tractor or a truck. Thus, when the valve 60 is in configuration (A) the pumping system 50 may be used to pump fluid from the tank 65 to the structure 75. In FIG. 4B, however, when the valve 60 is in configuration (C), fluid may be drawn from the structure 75, through the valve 60, and to the pump 55 where it is pumped to the valve 60, and then to the tank 65. Thus, when the valve 60 is in configuration (C), the pumping system 50 may be used to pump fluid from the structure 75 to the tank 65. Accordingly, the pumping system 50 according to example embodiments may be used to either fill the tank 65 with a fluid obtained from an outside structure 75, for example, a DEF tote, or supply fluid from the tank 65 to an outside structure 75, for example, a DEF tank of a tractor, car, or truck.

Example embodiments illustrate a novel and useful pumping system that may be used to both fill a tank of the pumping system with fluid and pump the fluid from the tank to a structure. Such a novel system is advantageous over conventional systems that utilize different pumps for filling a tank with a fluid and extracting fluid from the tank. Although example embodiments are illustrated as using a four-way valve in line with a pump, the invention is not limited thereto as other suitable valves and pumps may be used. For example, the system could use a reversible pump rather than a unidirectional pump and a four way valve.

Figure 10:
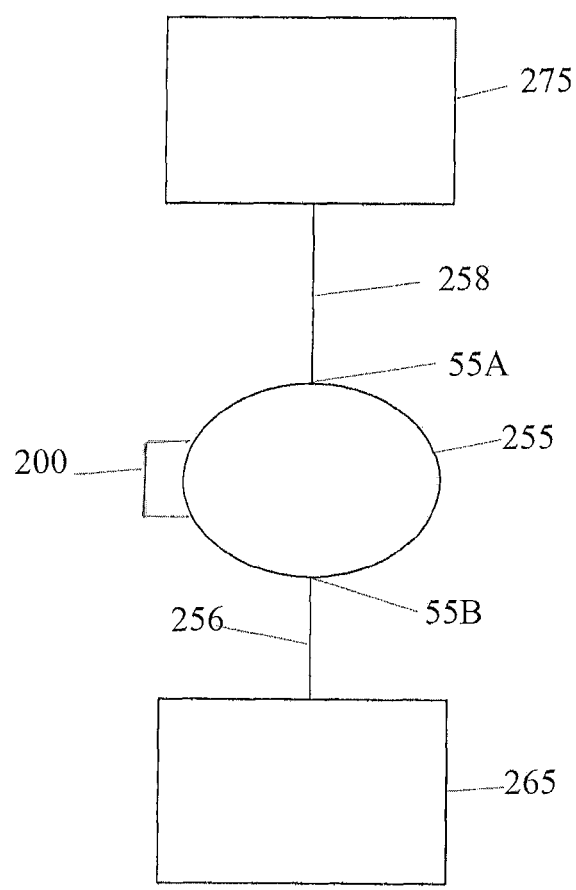
FIG. 10 is a schematic of a pumping system in accordance with example embodiments.
Figure 11:
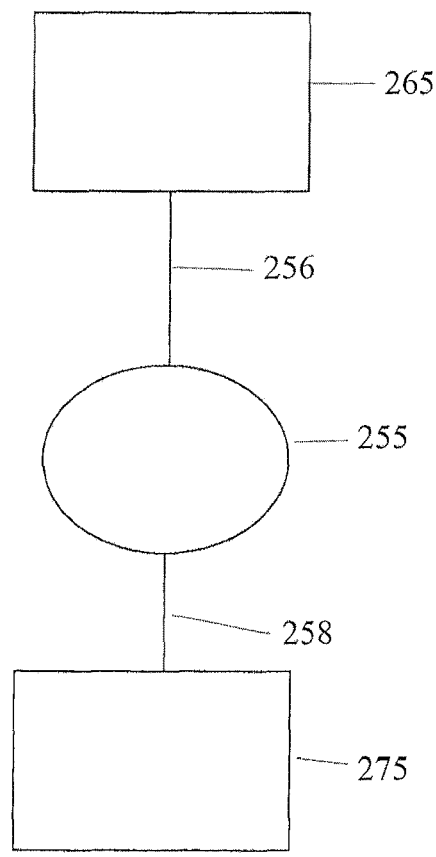
FIG. 11 is a flow diagram of the pumping system in accordance with example embodiments.
Figure 11:
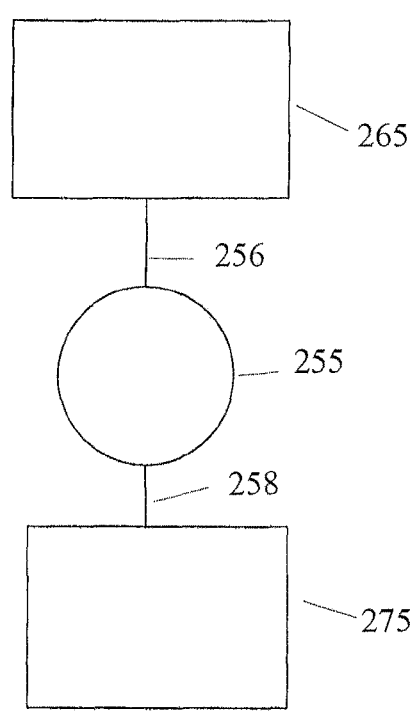

FIGS. 10 and 11 show embodiments of the system wherein a pump 255 is powered by the reversible motor 200. Upon reversal of the motor 200 (which may be a direct current motor which is reversed by a reverse in the current) the direction of flow of the fluid is also reversed. A two-way valve 260, which may be open or closed, may be employed to govern the flow while the motor's direction governs the direction of flow of the fluid, however, a two-way valve is not necessary for the operation of this embodiment. This arrangement of elements is provided to move DEF or other fluid to or from a reservoir 265. The fluid may be moved from the reservoir 265 through conduits or connecting members 256, 257 and a connection device 160 which may include a nozzle. The connection device 160 may facilitate transfer of the fluid from the system to a tank or other container such as a storage fuel tank or a fuel tank associated with an engine and/or a vehicle where it may be used as a fuel. In some embodiments, the pump 255 can be used to remove remaining fluid from the conduits to avoid damage from freezing. If desired, the pump 255 and motor 250 can be used to remove fluid from the reservoir, as well. Clearing the conduits reduced or nearly eliminates contamination possibilities.

Figure 5A:
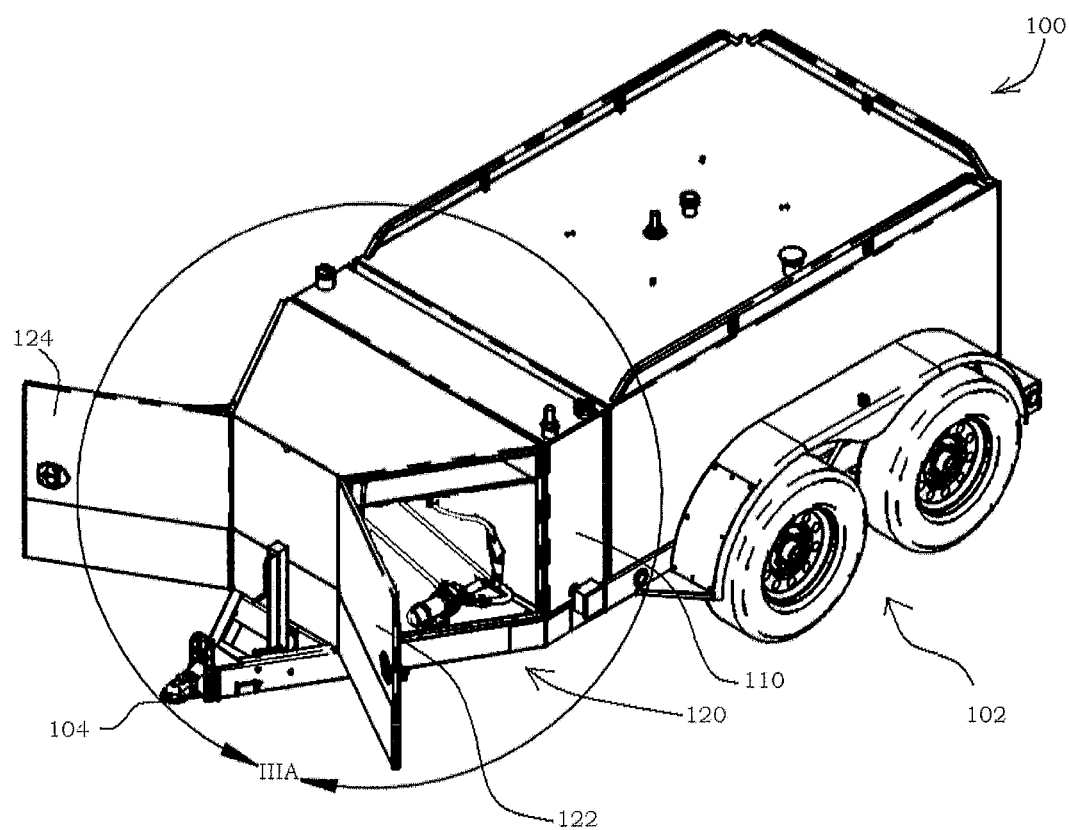
FIG. 5A is a view of a fluid delivery device in accordance with example embodiments.
Figure 5B:
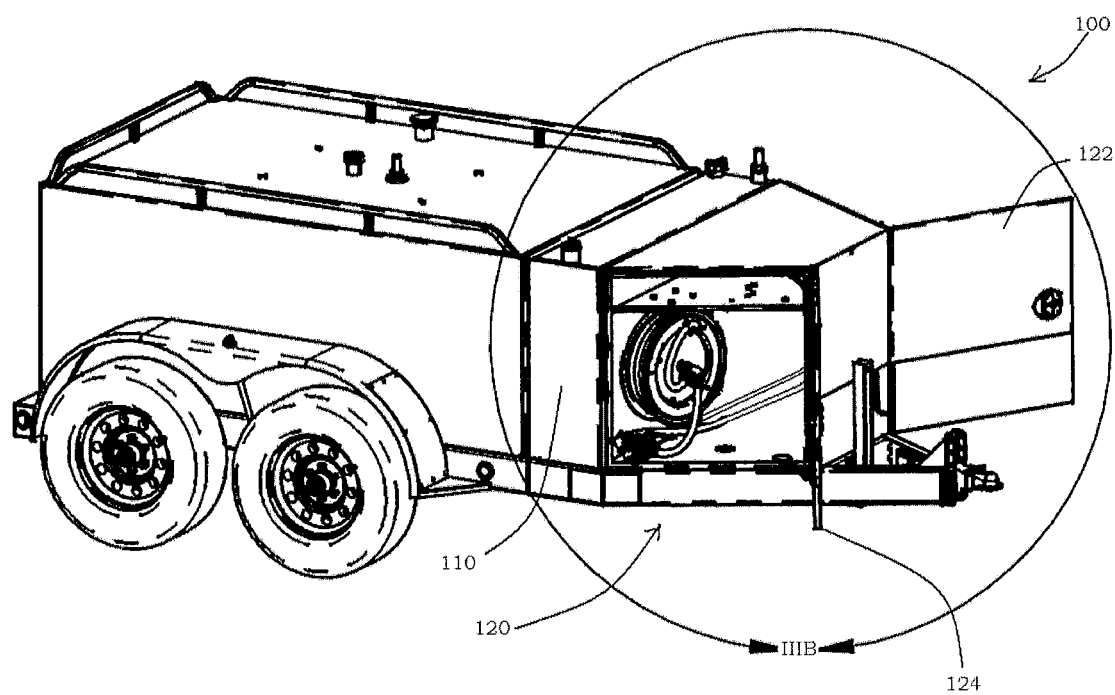
FIG. 5B is another view of a fluid delivery device in accordance with example embodiments.

FIGS. 5A and 5B are perspective views of a fluid delivery device 100 in accordance with example embodiments. The fluid delivery device 100 may be used to transport fluid, for example, diesel exhaust fluid (DEF) from one location to another. As shown in FIGS. 5A and 5B, the fluid delivery device 100 may resemble a trailer in that one end of the fluid delivery device 100 may include a set of wheels 102 while another end of the fluid delivery device 100 may include a connecting device 104, for example, a ball/hitch connection or chains, for connecting the fluid delivery device 100 to an automobile such as a truck, tractor, or car. Example embodiments, however, are not limited thereto. For example, rather than providing wheels 102 at the back end of fluid delivery device 100, skids may be provided instead, or in the alternative, tracks, such as those found on tanks, may be employed. In addition, the fluid delivery device 100 is not limited to a trailer configuration as the fluid delivery device 100 may be configured to be part of a self propelled automobile. In the alternative, the fluid delivery device 100 may instead be part of a static nonmoving structure.

As shown in FIGS. 5A and 5B, a compartment 120 may be provided in the fluid delivery device 100. The compartment 120, for example, may be provided near one end of the fluid delivery device 100. Example embodiments, however, are not limited thereto as the compartment 120 may be provided at another location of the fluid delivery device 100, for example, near a middle thereof. In example embodiments the compartment 120 may include at least one door to allow a user to access the compartment 120. For example, the at least one door may include a first door 122 and a second door 124 which may be hinge connected to the fluid delivery device 100. Thus, access to the compartment 120 may be obtained from two directions by opening at least one of the first and second doors 122 and 124. Example embodiments, however, are not limited to two doors. For example, only one door may be provided to gain access to the compartment 120 or more than two doors may be provided. Furthermore, the doors need not be hinge connected to the fluid delivery device 100. For example, the doors may be entirely removable or slidingly attached to the fluid delivery device 100.

In example embodiments, a tank 110, for example, a deionized tank (purified to ISO 22241 standard), may be provided adjacent to the compartment 120. For example, as shown in FIGS. 5A-5B, the tank 110 may be provided at a side of the compartment 120. Example embodiments, however, are not limited thereto. For example, rather than providing the tank 110 behind the compartment 120 as shown in FIGS. 5A-5B, the tank 110 may be provided on top of the compartment 120, below the compartment 120, in front of the compartment 120, or even in the compartment 120. Alternatively, an interposing structure, for example, another compartment, may be provided between the compartment 120 and the tank 110. In example embodiments the tank 110 may be configured to store diesel exhaust fluid (DEF). Thus, the tank 110 may be comprised of a material which may be suitable for storing the diesel exhaust fluid (DEF). For example, the tank 110 may be comprised of stainless steel.

Figure 6A:
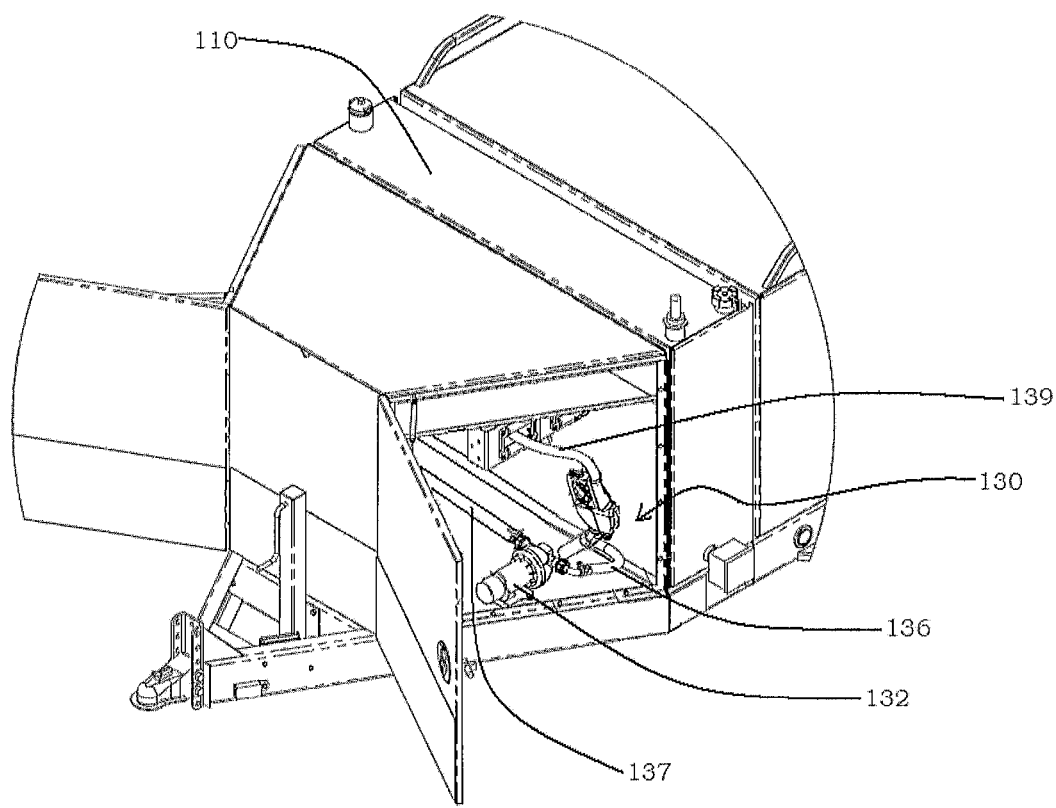
FIG. 6A is a view of a pumping system of the fluid delivery device in accordance with example embodiments.
Figure 6B:
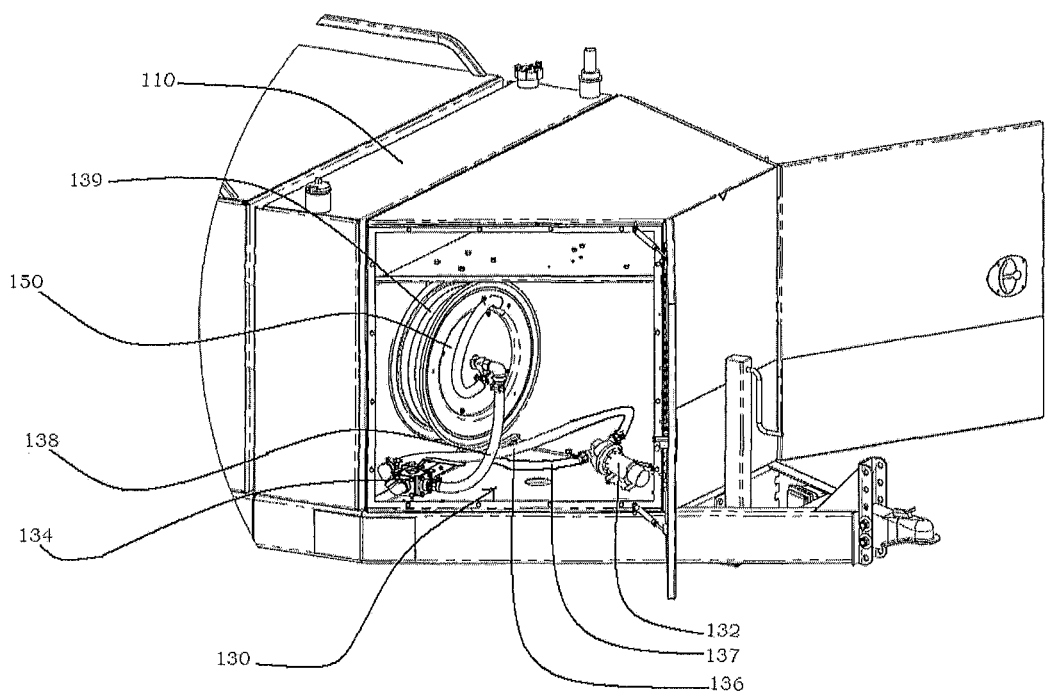
FIG. 6B is another view of the pumping system of the fluid delivery device in accordance with example embodiments.

In example embodiments, a pumping system 130 (see FIGS. 6A and 6B) may be provided to move fluid, for example, diesel exhaust fluid (DEF), to or from the tank 110. In example embodiments, the tank 110 may be considered part of the pumping system. The pumping system 130, for example, may include a pump 132, a valve 134, the tank 110 and fluid transporting members, for example, hoses, to transport fluid through the pumping system 130. For example, in example embodiments, the transporting members may include a first hose 136 to move fluid from the pump 132 to the valve 134, a second hose 137 to move fluid from the valve 134 to the pump 132, a third hose 138 to move fluid from the valve 134 to a fourth hose 139 which may be wrapped around a hose reel 150. Also, though not shown in FIGS. 5A-6B, the transporting members may further include a fifth hose which may be provided to move fluid between the valve 134 and the tank 110.

In other embodiments (see FIGS. 10 and 11) the pumping system 130 may comprise pump 255, a reversible motor 200, a reservoir 265, and, optionally, a valve 260. When the motor 200 is run in a first direction, the DEF or other fluid flows a first direction and when the motor 200 is run in a second direction, the DEF or other fluid flows in a second direction. The flow (but not the direction) may be controlled by valve 260 which may be adjusted between and including an open position and a closed position. However, the valve 260 is not necessary to operate the system. The pumping system 130 of this embodiment may be used to move DEF or other fluid between a reservoir 265 incorporated in the mobile fuel pumping system 130 and a tank 275 which may be outside of the mobile fuel pumping system. The tank 275 may be a movable tank such as on a vehicle or it may be stationary such as a fuel storage tank. The pump 255 may be run to void any conduit or connecting member 256 leading to or from the reservoir 265, any conduit or connecting member 258 leading to and from the pump 255, and the pump 255 itself to drastically reduce or eliminate problems that would otherwise be caused by fluid freezing. If needed, the pump 255 can be used to evacuate the reservoir 265, as well. The mobile fuel pumping system 130 may comprise a trailer having a hookup for associating the trailer with a motorized vehicle or the system may be permanently or detachably affixed to a motorized vehicle such as a truck.

In example embodiments, structures may be provided between the various transporting members to facilitate connectivity of the pumping system. For example, various quick connect structures or couplers may be interposed in the various transporting members to connect the transporting Members to the pump 132 and/or the valve 134, 260. In addition, some of the transporting members may not be necessary. For example, in example embodiments, rather than providing a transport member between the valve 134 and the tank 110, an extension of the valve 134 may be threaded into a wall separating the compartment 120 from the tank 110 to allow for fluid in the tank 110 to enter the valve 134 directly. In example embodiments, the transport members are not limited to hoses. For example, rather than providing hoses, tubing or pipes may be provided to transport fluid to or from the pump 132, 255 to the valve 134, 260 and to or from the valve 134, 260 to the pump 132, 255.

In example embodiments, the pump 132 may be an electric pump which may be powered by a battery, for example, a deep-cycle marine battery, which may or may not be stored in the compartment 120. However, example embodiments are not limited thereto. For example, the pump 132 may be an electric pump which is powered by a battery of an automobile, for example, a truck, tractor, or car that may be used to move the diesel exhaust fluid (DEF) delivery device 100. As another example, the pump 132 may be an electric pump which is powered by an AC source. For example, the pump 132 may be connected to wall socket of a conventional building. In addition, the pump 132 is not limited to an electric pump 132. For example, the pump 132, 255 may be powered by a gasoline or diesel engine or a DC motor 200 which may be reversed if the current is reversed. Further yet, the pump may be a manual pump. In example embodiments, the valve 134 may be a four-way valve similar to the four-way valve 60 of the pumping system 50 or, alternatively, it may be a two way valve 260, especially when the motor 300 is a reversible motor thereby eliminating the need for a 4-way valve. When a two-way valve 260 is employed its purpose is to allow flow or stop flow; the direction flow is controlled by the motor 200 rather than the valve 260. In other embodiments with the reversible motor 200 no valve 260 is employed at all. The system is closed such that the motor can be run to empty the conduits 258 and 257 and the pump itself leaving nothing to freeze and no contamination.

In example embodiments, one of said hoses or conduits may have an end fitted with a connection device 160 to facilitate a connection between the hose and an outside structure. For example, the connection device 160 may be an auto trip nozzle which may be used to fill a standard DEF tank of a truck or a tractor. In the alternative, the connection device 160 may be a coupler, for example, an RSV coupler, that may be used to connect the hose to an external structure 170, for example, a tank or a tote.

Figure 7A:
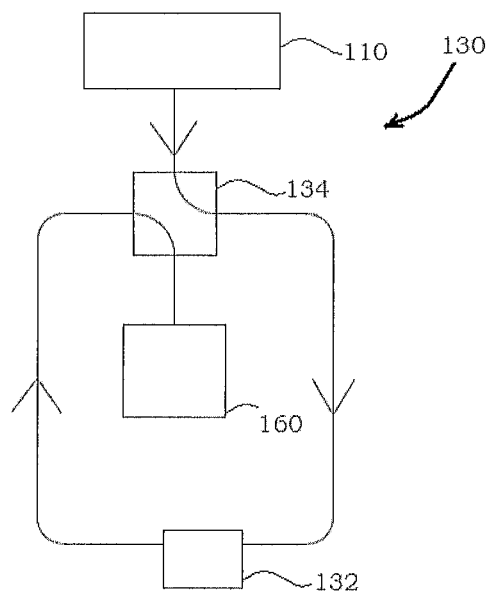
FIG. 7A is a flow diagram of the pumping system of the fluid delivery device in accordance with example embodiments.
Figure 7B:
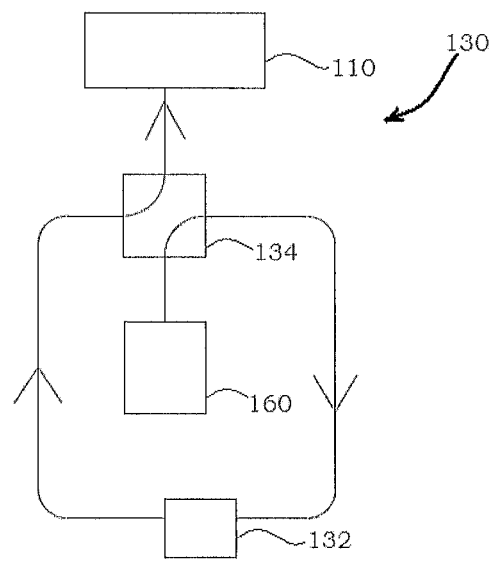
FIG. 7B is a flow diagram of the pumping system of the fluid delivery device in accordance with example embodiments.

In example embodiments, the pumping system 130 arranged in the fuel delivery device 100 may operate similar to the pumping system 50. Thus, only a brief description of the operation of the pumping system 130 will be provided. In example embodiments, the valve 134 may be a four-way valve similar to the four-way valve 60 of the pumping system 50. Thus, the valve 134, like valve 50, may have a first configuration which controls a direction of fluid flow as shown in FIGS. 7A and 7B. In FIG. 7A, for example, the valve 134 may be in a first configuration which allows fluid to be drawn from the tank 110 to the valve 134 where it may be pumped through pump 132 and returned to the valve 134 where the fluid is then transported to the connection device 160 mounted on the fourth hose 139. As noted above, the connection device 160, for example, may be auto trip nozzle. Thus, when the valve 134 is in the first configuration the pumping system 130 may be used to pump fluid from the tank 110 to the connection device 160. As shown in FIG. 7B, however, when the valve 134 is in a second configuration, fluid may be drawn from through the connection device 160, through the valve 134, through the pump 132, returned to the valve 134, and then to the tank 110. Thus, when the valve 134 is in a second configuration, the pumping system 130 may be used to pump fluid from the connection device 160 to the tank 110. Accordingly, the pumping system 130 according to example embodiments may be used to either fill the tank 110 with a fluid, for example, DEF, passing through the connecting device or supply fluid from the tank 110 to the connecting device 160.

As shown in FIGS. 10 and 11, when a reversible motor 200 is employed to run the pump 255, the motor 200 may be reversed thereby causing the direction of flow of the fluid to reverse. A two-way valve 260 may be included to allow or disallow flow, however this valve does not dictate the direction of fluid through the valve. In this embodiment the system may be used to either fill reservoir 265 with a fluid from tank 275 or to supply fluid from the reservoir 265 to another vessel or tank 275, Similarly, the system may be used without a valve 260; the use of a reversible motor 200 in a closed system provides means for complete evacuation of freezable fluid from the first hose or conduit 256 or first connecting member and the second hose 258 or second connecting member for reducing contamination to levels acceptable under ISO 22241 and to avoid issues caused by freezing.

Figure 8:
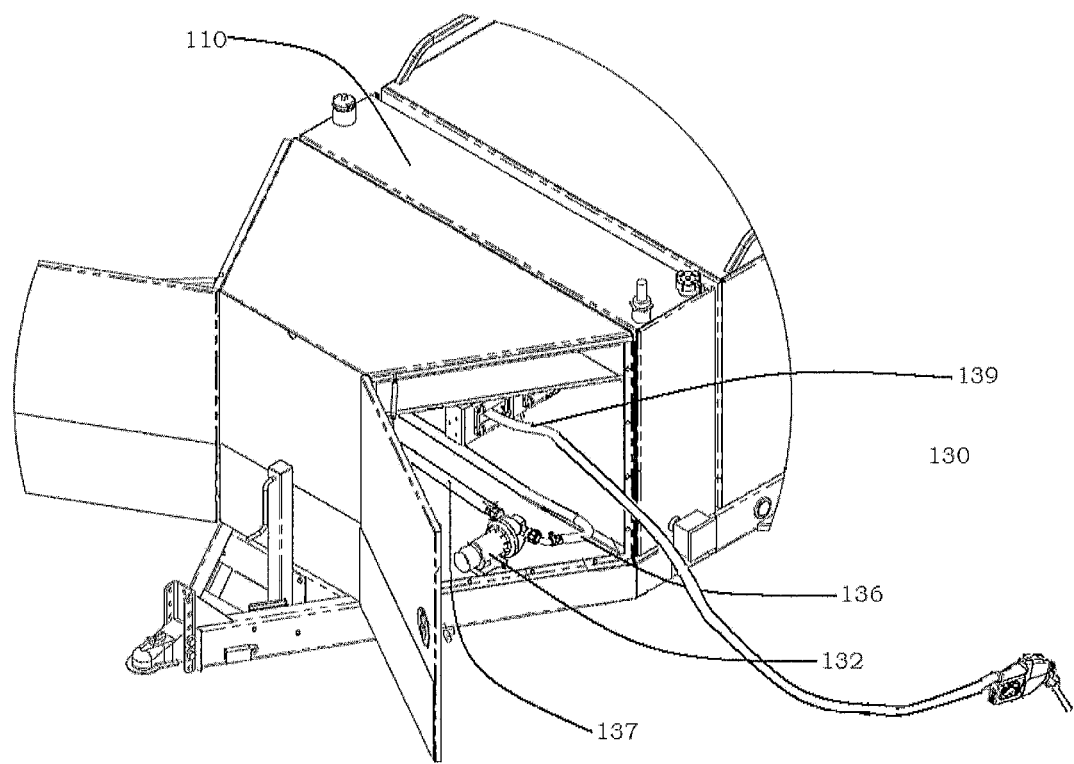
FIG. 8 is a view of the fluid delivery device in accordance with example embodiments.
Figure 9:
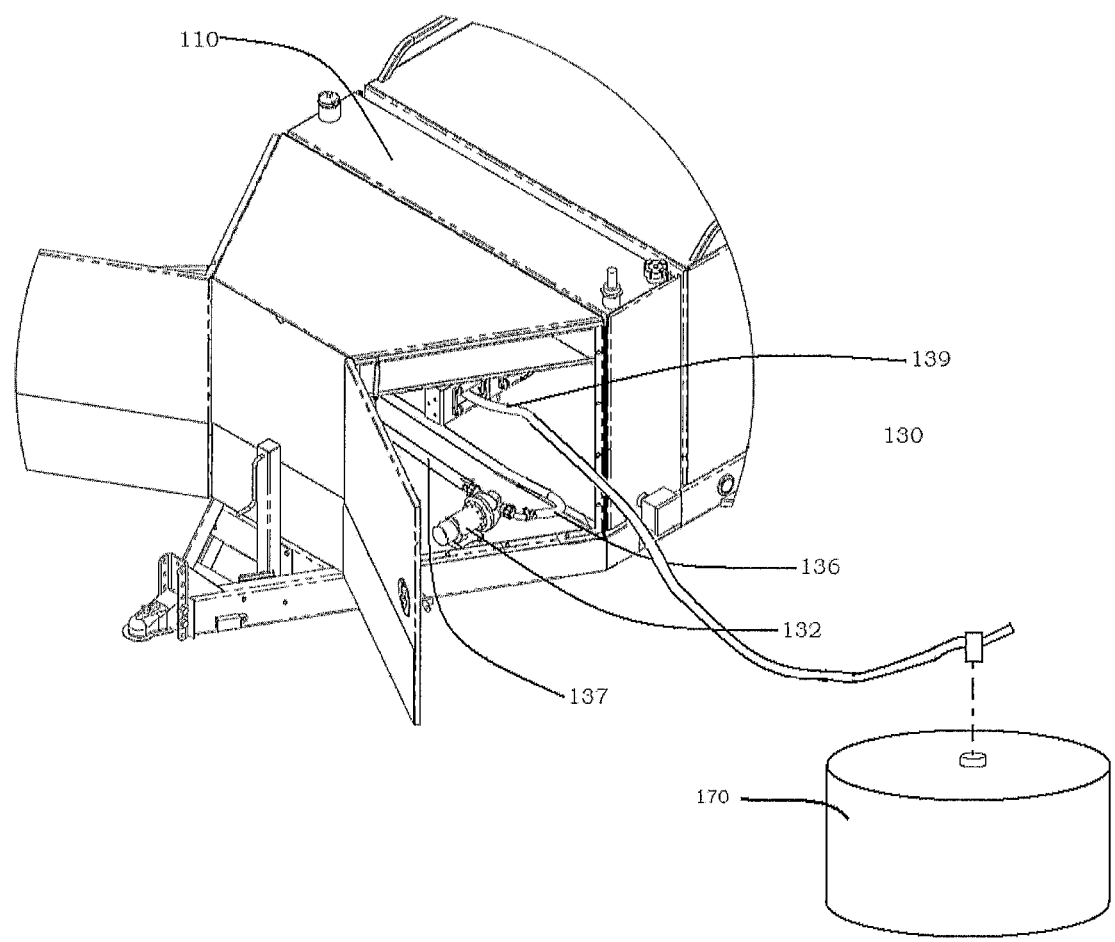
FIG. 9 is a view of the fluid delivery device in accordance with example embodiments.

FIG. 8 shows the fourth hose 139 being pulled out of the compartment 120, In FIG. 8, the fourth hose 139 is fitted with an auto trip nozzle as the connection device 160. An activation of the pump 132 may cause fluid, for example, DEF fluid, to be drawn from the tank 110 and to the connection device 160 as shown in FIG. 7A, Thus, a user may utilize the fluid delivery device 100 to deliver fluid via the pumping system 130 to an outside structure, for example, a tank of a tractor or a truck. Similar embodiments may be employed with the reversible motor 200 versions as well. Example embodiments, however, are not limited to the above use. For example, rather than using an auto trip nozzle as the connection device 160, a user could use, instead, a coupler, for example, an RSV coupler, as the connection device 160. Such a coupler may be used to connect fourth hose 139 to a tote 170 (see FIG. 9) which may be filled with fluid, for example, DEF. Thus, an activation of the pump 132 may cause fluid, for example DEF fluid, to be drawn from the tote 170, through the pumping system 130, and to the tank 110 as shown in FIG. 7B.

In short, example embodiments provide a fluid delivery device 100 which includes a pumping system 130. The pumping system 130 may be incorporated into a device, such as a trailer or an automobile, to form the delivery device. In example embodiments, the pumping system 130 includes a pump 55 or 255 and a tank 65 or reservoir 265 which is mobile since the delivery device 100 may be configured as a trailer or an automobile. Thus, the delivery device may be used to transport a fluid, for example, DEF, to different locations. The delivery device also includes a fluid transporting members which may be used to move fluid through the pumping system and to a structure such as a tank or vessel 275 which is outside of the fluid delivery device 100. One of the fluid transporting members may be fitted with a connection device, such as an auto trip nozzle, to facilitate a connection between the pumping system 130 and an external structure 275 which may be a tank of a car, truck, or tractor. In the alternative, the connection device may be a coupler, such as an RSV coupler, to connect the pumping system to a source of the fluid, for example DEF, in order to allow the pumping system 130 to fill the tank. As configured, a same pump may be used to both fill the reservoir 265 of the pumping system or dispense the fluid to an outside structure, vessel or tank 275.

The instant invention has considerable advantages over the prior art, especially with respect to delivering DEF. For example, ISO 22241 requires a closed load and unload system to eliminate contamination. The instant invention ensures DEF may be delivered from a closed shuttle to a deionized (purified to ISO 22241 standard) tank that may be on a trailer. By using the 4-way valve in a fill position or by employing a reversible motor to effect change in flow direction, DEF may be transferred to a DEF tank of an engine or vehicle being filled while staying within a closed noncontaminated environment.

Example embodiments of the invention have been described in an illustrative manner. It is to be understood that the terminology that has been used is intended to be in the nature of words of description rather than of limitation. Many modifications and variations of example embodiments are possible in light of the above teachings. Therefore, within the scope of the appended claims, the present invention may be practiced otherwise than as specifically described.

What I claim is:

1. A mobile fluid pumping system comprising a pump having a reversible motor, said motor operating in either a first direction or a second direction, a tank, a first connecting member providing fluid communication between the pump and the tank, a reusable stainless valve (RSV) quick coupler compliant with the ISO 22241-3:2008(E) quality standard and configured to provide association with said connecting member said first connecting member defining a single route, said route providing direct fluid communication in either direction from said reversible motor, the reversible motor operating in the first direction causing a fluid to move through said single route in the first direction toward the tank, and the reversible motor operating in the second direction causing fluid to move through the single route in a second direction away from the tank, said system providing a closed load and unload system.

2. The pumping system of claim 1 wherein operating said reversible motor in the first direction causes fluid from an external structure to be pumped in the first direction through the connecting member to the tank.

3. The system of claim 2 wherein operating said motor in the second direction causes fluid to be pumped through said single route in the second direction from the tank through the connecting member to the external structure.

4. The mobile fluid pumping system of claim 2 wherein operating said motor in the second direction causes fluid to be pumped in the second direction from the tank through the connecting member to a second external structure.

5. The assembly of claim 1 wherein said pump can be operated to void fluid from said connection, said connecting member, and said pump.

6. The system of claim 1 wherein the mobile fluid pumping system comprises means to transport together said tank, said reversible motor, said connection and said connecting member, said means to transport comprising a trailer.

7. The system of claim 6 wherein said mobile fluid pumping system may alternatively transfer fluid along said route from said external structure to the tank or from said tank to said external structure.

8. The mobile fluid pumping system of claim 1 further comprising a nozzle associated with said quick coupler for filling said external structure.

9. A mobile fluid pumping system comprising a tank, a reversible flow path comprising a connecting member extending from the pump, and means to cause fluid to flow wherein said fluid comprises DEF, said means to cause fluid to flow comprising a pump and a reversible motor, the reversible motor operating in the first direction causing a fluid to move in a first direction into the tank and the reversible motor operating in a second direction causing said fluid to move in a second direction out of the tank said tank and the pump in fluid communication, a valve compliant with the ISO 22241-3:2008(E) quality standard and a nozzle, said connecting member comprising a single, reversible route for loading DEF into and unloading DEF out of the tank.

10. The system of claim 9 wherein said RSV quick coupler comprises a configuration to provide association with the connecting member.

11. The assembly of claim 9 further comprising an external structure separately mobile from the fluid tank wherein said pump moves fluid from said separately mobile external structure to the tank.

12. The assembly of claim 11 wherein said pump moves fluid from said tank to the separately mobile external structure.

13. An assembly for providing a mobile fluid tank, said assembly comprising a closed system having a pump, a reversible motor, a tank, and a single connecting member including a first end in direct fluid association with the pump which is in fluid communication with the tank, and a second end in fluid communication with an external structure wherein said fluid association comprises a valve compliant with the ISO 22241-3:2008E quality standard and facilitates flow of fluid in a first direction through said connecting member to said tank during the motor's forward operation and in a second direction from said tank back through said connecting member to said external structure during the motor's reverse operation wherein said reversible motor comprises a direct current motor.

14. The assembly of claim 13 said valve comprising a RSV quick coupler associated with the connecting member thereby facilitating movement of fluid from the external structure to the tank.

15. The assembly of claim 13 wherein said reversible motor comprises a direct current motor and the fluid consists of DEF.

16. A mobile fluid pumping system comprising a tank, a single, reversible flow path, and means to cause fluid to flow wherein said fluid comprises DEF, said means to cause fluid to flow comprising a pump and a reversible motor and a closed system, an ISO 22241-3:2008(E) compliant coupler associated with a connecting member; said tank and the pump in fluid communication, said reversible flow path comprising a portion of the path between the pump and the tank, the connecting member extending from the pump to an external structure separately mobile from the tank, said portion of the path and connecting member comprising the single, reversible flow path for loading or unloading DEF between the tank and an external structure, said flow reversed with the direction of the motor.

* * * * *